(12) United States Patent
Austin et al.

(10) Patent No.: US 7,718,941 B2
(45) Date of Patent: May 18, 2010

(54) BAFFLED SUN SENSOR ANTENNA ALIGNMENT MONITORS

(75) Inventors: Robert Wayne Austin, Huntsville, AL (US); Gregory A. Mercier, Madison, AL (US); Bruce Weddendorf, Huntsville, AL (US)

(73) Assignee: Sunsight Holdings, LLC, Oviedo, FL (US)

( * ) Notice: Subject to any disclaimer, the term of this patent is extended or adjusted under 35 U.S.C. 154(b) by 0 days.

(21) Appl. No.: 12/007,320

(22) Filed: Jan. 9, 2008

(65) Prior Publication Data

US 2008/0169413 A1 Jul. 17, 2008

Related U.S. Application Data

(60) Provisional application No. 60/880,028, filed on Jan. 12, 2007.

(51) Int. Cl.
*G01C 21/02* (2006.01)
(52) U.S. Cl. .................................... 250/203.4
(58) Field of Classification Search ... 250/203.1–203.4, 250/206.1
See application file for complete search history.

(56) References Cited

U.S. PATENT DOCUMENTS

| | | | |
|---|---|---|---|
| 3,713,740 A * | 1/1973 | Lillestrand et al. | ..... 356/139.02 |
| 4,752,780 A | 6/1988 | Pipkin | |
| 4,794,245 A | 12/1988 | Auer | |
| 4,810,870 A | 3/1989 | Tsuno et al. | |
| 5,572,316 A | 11/1996 | Zaffanella et al. | |
| 5,698,842 A | 12/1997 | Fallon et al. | |
| 5,760,739 A | 6/1998 | Pauli | |
| 5,808,583 A | 9/1998 | Roberts | |
| 5,844,232 A | 12/1998 | Pezant | |
| 5,914,483 A | 6/1999 | Fallon et al. | |
| 6,084,228 A | 7/2000 | Hill et al. | |
| 6,208,315 B1 | 3/2001 | Kenmochi | |
| 6,490,801 B1 | 12/2002 | Hersom et al. | |
| 6,686,889 B1 | 2/2004 | Kwon et al. | |
| 6,897,828 B2 | 5/2005 | Boucher | |
| 7,180,471 B2 | 2/2007 | Boucher | |
| 2002/0047085 A1 | 4/2002 | Sumiya | |
| 2002/0084941 A1 | 7/2002 | Matz et al. | |
| 2004/0187907 A1 | 9/2004 | Morgal | |
| 2005/0043866 A1 | 2/2005 | Litchfield et al. | |
| 2005/0237215 A1 | 10/2005 | Hatfield et al. | |

OTHER PUBLICATIONS

Niemelä, Jarno and Lempiäinen, Jukka. *Impact of Mechanical Antenna Downtilt on Performance of WCDMA Cellular Network.*
Dinan, Esmael and Kurochkin, Aleksey A. *The Impacts of Antenna Azimuth and Tilt Installation Accuracy on UMTS Network Performance.* Bechtel Telecommunications Technical Journal, vol. 4, No. 1. 2006.
*Coded Aperature Imaging in High-Energy Astronomy.* NASA. Mar. 9, 2006.

\* cited by examiner

*Primary Examiner*—Thanh X Luu
(74) *Attorney, Agent, or Firm*—Dowell & Dowell, P.C.

(57) ABSTRACT

A directional alignment and alignment monitoring sensor system that is designed to be mounted to a directional or omni-directional antenna wherein the system includes a sensor having one or more phototransistors that are associated with one or more baffle members and wherein each baffle member defines a restrictive light passageway toward a phototransistor such the by measuring the time that a phototransistor is illuminated, a correct orientation of the antenna may be accurately determined.

24 Claims, 8 Drawing Sheets

BAFFLED SUN SENSOR ANTENNA ALIGNMENT MONITORS

CROSS REFERENCE TO RELATED APPLICATIONS

This application is related to and claims the benefit of U.S. Provisional Application 60/880,028 in the name of the same inventors.

BACKGROUND OF THE INVENTION

1. Field of the Invention

The present invention relates to directional alignment and alignment monitoring systems for directional and planar pattern omni-directional antennas.

2. Brief Description of the Related Art

Alignment of directional antennas is important in a competitive industry with customers expecting uninterrupted cell phone and other communications. See the reference paper "Impact of Mechanical Antenna Downtilt on Performance of WCDMA Cellular Network" also the paper "Impacts of Antenna Azimuth and Tilt Installation Accuracy on UMTS Network Performance" by Bechtel Corp, both of which are incorporated herein by reference.

Several types of metrology equipment are currently used to align directional antennas. These include standard construction tools such as levels and transits. By way of example, by locating a person at a distance from an antenna at a known heading, the antenna may be sited using a compass, GPS, survey, laser or transit or other optical means. Such methods require a technician or team of technicians to climb to the antenna, which is normally mounted at an elevated location, usually on a tower, and actively align and measure the antenna position directly, with their hands on the antenna. No devices are currently known that remotely monitor antenna alignment after installation or verify exact alignment during or after installation.

Hands-on alignment is a significant cost to owners of directional and omni-directional antennas and accurate information is crucial when relating to overall RF system design. Currently, there is no all-inclusive method to double check tower crew measurements. Each time a storm hits an area or a period of time passed dictates a need to re-verify alignment, a crew of technicians must climb to the antenna and physically check alignment of the antenna. The measurements are complex and made in a difficult environment high above the ground. If a mistake is made, there is no way to verify the alignment directly. Only by a study of antenna power distribution made by checking the area the antenna is servicing with radio test equipment and comparing the signal strength to a master can proper alignment be determined and this is a costly and time consuming process. Also, this method is indirect, as other factors besides alignment may affect signal strength.

SUMMARY OF THE INVENTION

This invention is directed to a directional alignment and alignment monitoring system for directional or omni-directional antennas based on solar position alone or in combination with electronic level sensing. Additionally, this invention can be configured to monitor antenna alignment relative to a fixed artificial light source. The invention includes sensors that mount to the antennas to be aligned plus a central data collection and processing unit. The system may be permanently mounted to an antenna and monitors its position frequently, ensuring long term alignment and making it possible for the owner of the antenna to check the antenna alignment and the history of that alignment on an "on going" basis without sending technicians to the antenna site and without technicians having to climb to the antenna to physically check the alignment.

Each alignment monitoring system includes a light sensor including at least one phototransistor mounted within a housing that has at least a transparent wall portion through which light from the sun or from a fixed light source may enter into the housing. At least one baffle member is mounted within the housing to prevent incoming light from illuminating the phototransistor except when the incoming light is aligned with a slot in the baffle member that is open to the phototransistor. The invention uses the sensed time of illumination of the at least one phototransistor and a known orientation of the light source to determine an angular relationship of the sensor, and thus the antenna, to the light source. In some embodiments, the baffle member that is mounted in fixed relationship to the at least one phototransistor, may be indexed or moved in controlled movement relative to one or more axes such that the exact position of the sensor at the time of illumination of the phototransistor may be used to determine an angular relationship between the antenna and the light source.

In some embodiments a plurality of phototransistors are mounted in a circular relationship within the housing with a separate baffle member being associated with each phototransistor. In this manner, a plurality of time recordings at different relative incoming light angles may be used to accurately determine the relative orientation of an antenna to a light source.

In other embodiments of the invention, the baffle members will include light passageways defined by opposing projections that create a plurality of narrow slits through which the incoming light must pass to illuminate a phototransistor. Chambers are defined between the slits having reflective walls to direct light outwardly away from the phototransistor or, adjacent the phototransistor, toward the phototransistor.

In yet a further embodiment of the invention, the baffle members are formed as a stack of opaque plates having beveled slots formed therein that are aligned with one another and with underlaying phototransistors. Light may be directed toward the slots after being reflected from reflective surfaces within the housing. The beveling of adjacent plates may be reversed so as to reflect undesired light from the slots. Again, the sensing of the time of illumination of the various phototransistors is used to determine an angular relationship or orientation of the sensor, as thus an antenna to which the sensor is mounted, relative to a light source.

In addition to the foregoing, in some embodiments of the invention, one or more electronic level sensors may be mounted within the housing of an alignment system to determine or measure tilt and roll of an antenna. When two level sensors are used they are mounted perpendicular to one another.

The present invention may be used to frequently and automatically check alignment of antennas. No personnel must climb to the antennas nor be in the vicinity for the system to check alignment. Alignment is checked independently of signal strength, which can help eliminate a source of antenna malfunction when attempting to solve a service problem. No extra cost is incurred to make frequent measurements or verifications using the invention, as all the measurements are made automatically. The invention may also be programmed to automatically alert the antenna owner to an out of alignment condition, relieving the antenna owner of maintaining a scheduled check of alignment.

BRIEF DESCRIPTION OF THE DRAWINGS

A better understanding of the invention will be had with reference to the accompanying drawings wherein.

DESCRIPTION OF THE PREFERRED EMBODIMENT

Figure 1:
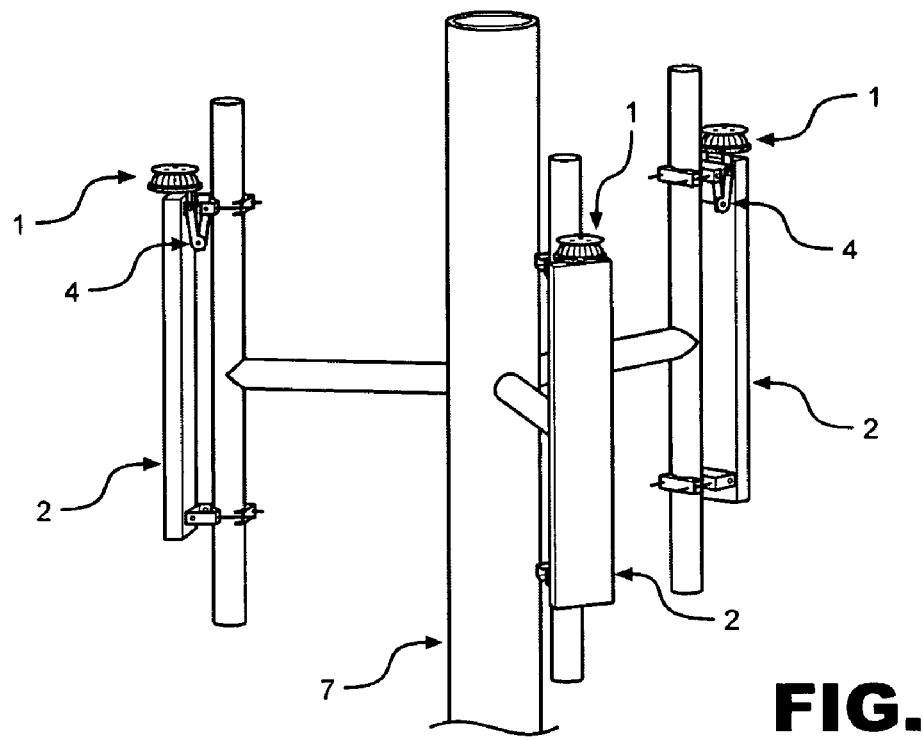
FIG. 1 is a perspective illustrational view showing sensors of the invention on an array of three directional antennas.
Figure 2:
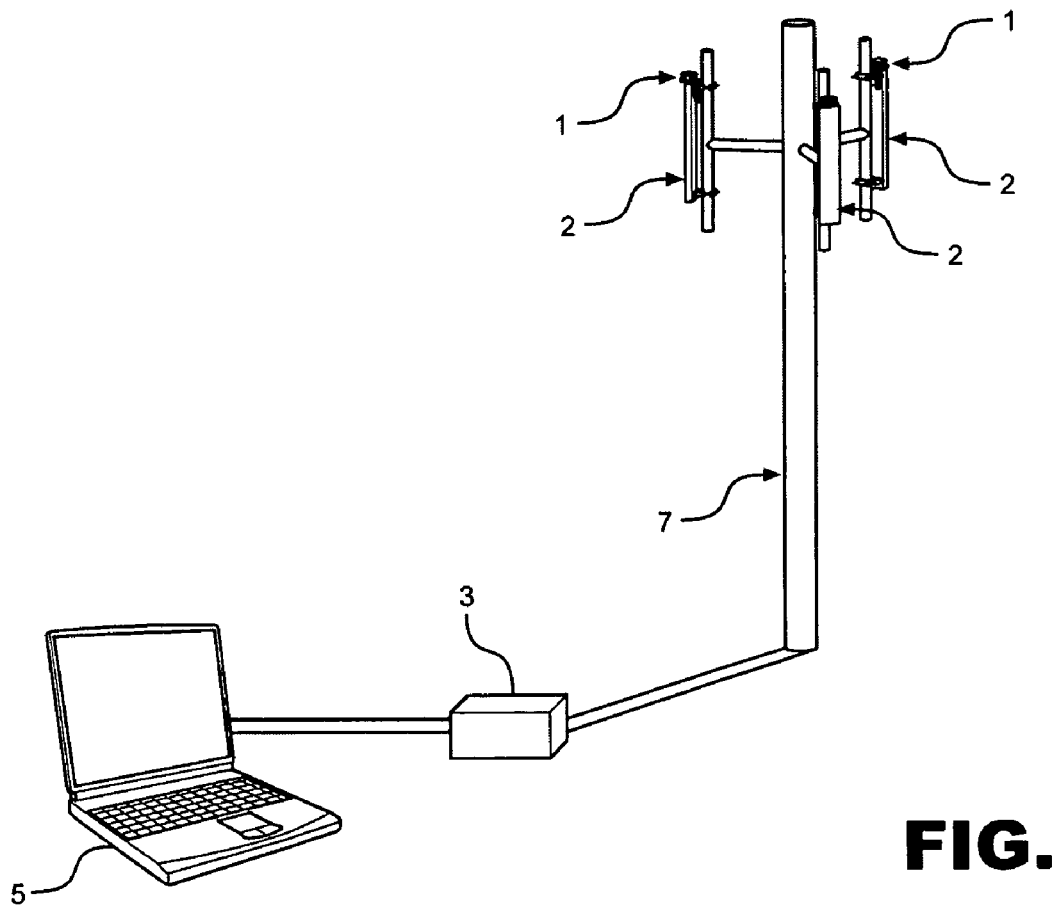
FIG. 2 is a perspective illustrational view showing the sensors of the system with the array of three directional antennas mounted to a pole and connected to monitoring equipment.
Figure 3:
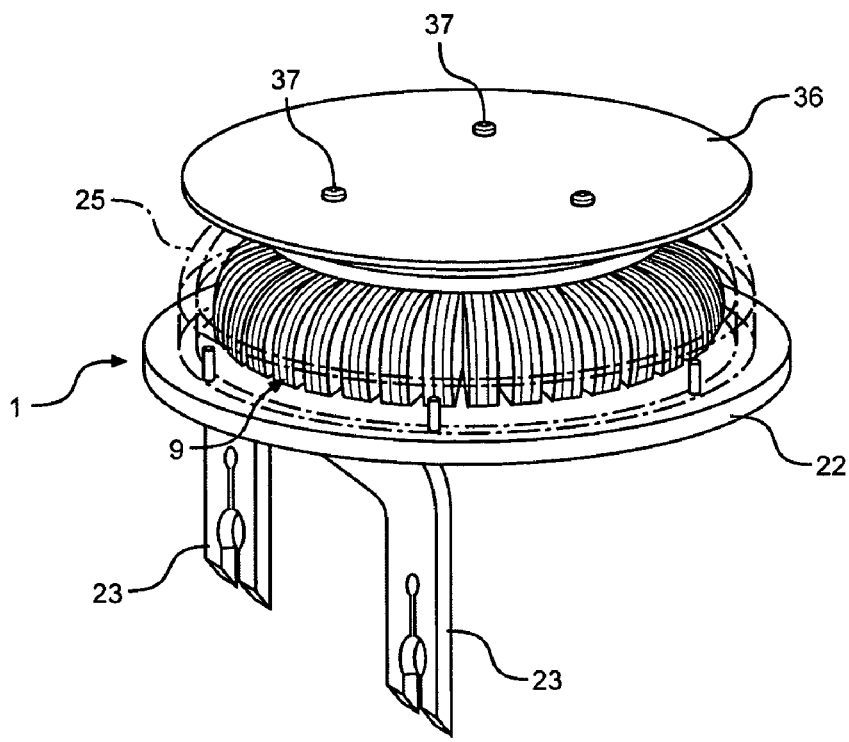
FIG. 3 is a perspective view of one of the fixed multi-element sensors shown in FIGS. 1 and 2.

This invention can be configured in four ways depending on the deployment environment. The basic system in all cases, see FIG. 1, consists of sensors 1 which mount to antennas 2 to be aligned plus a central data collection and processing unit 3, see FIG. 2. Each sensor 1 is mounted to an aligned directional antenna 2, with a known geometric relationship to the directional characteristic of the antenna such that the sensor is fixed in a known angular relationship to the antenna. This can be a single or multiple segment antenna, as long as there is a common structure that can be used to define alignment of all the segments. Antennas are typically mounted on poles, towers or buildings or other tall structures 7 overlooking coverage areas using some type of adjustable brackets 4 allowing adjustment of the antennas in azimuth, or heading, and tilt angle, the angle above or below horizontal along the antennas' center of energy heading direction.

Collection of data can be done at each sensor or at a remote central location. The preferred method is to have one data collection unit 3 for each site having multiple antennas, with the data collection unit accessible at the base of the tower or in an easily accessible control cabinet or room (not shown). Cables or wireless data transmission (not shown) connect the sensors to the data collection unit 3. Data storage, reduction and processing can also be done at each sensor 1 or in the data collection unit 3. It is also possible to have the data processing unit portable, such as a conventional computer 5. Collected data may be transferred to either a disk or direct connection of the sensors 1 to the data collection unit 3 during a site visit or over the Internet. Software to process the data can be located either on the end users' computer system or on a central Internet connected server. Files containing sensor data can be then sent to the server over the Internet for processing, and alignment results sent back to the end user. This method allows the software used to process the data to remain in possession of the supplier of the system so that a fee may be collected for each alignment check performed by the end user.

Figure 6:
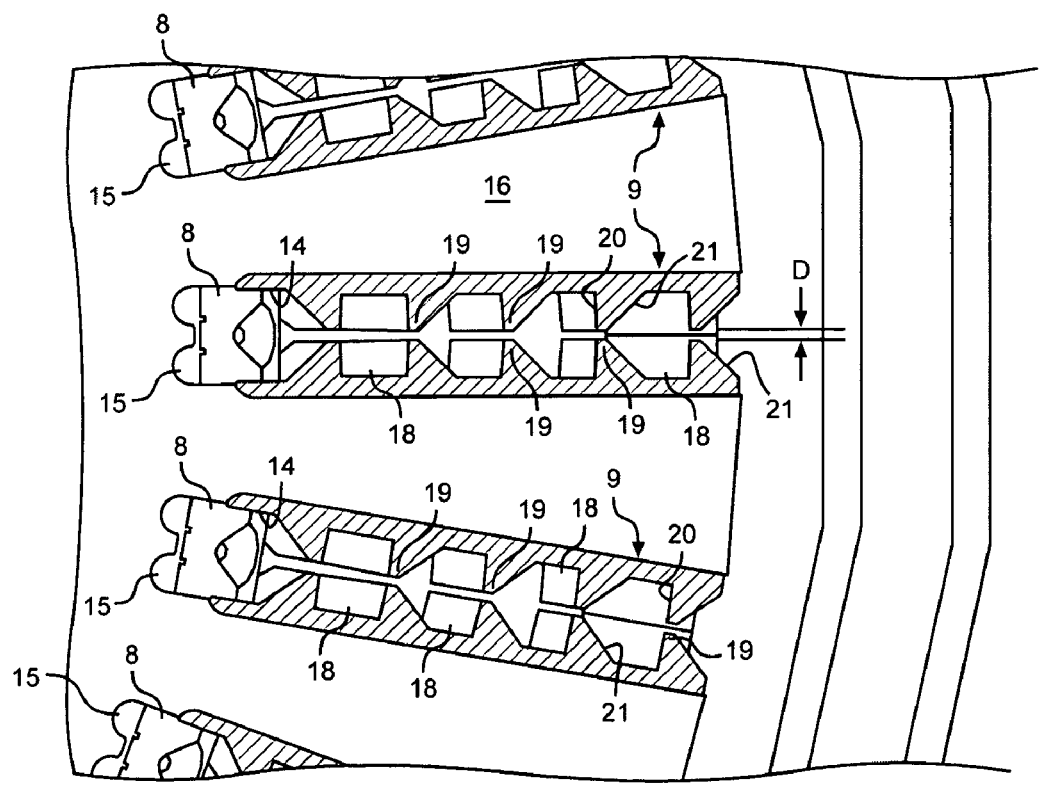
FIG. 6 is an enlarged horizontal cross sectional view through several of the phototransistors and baffle of FIG. 5.
Figure 7:
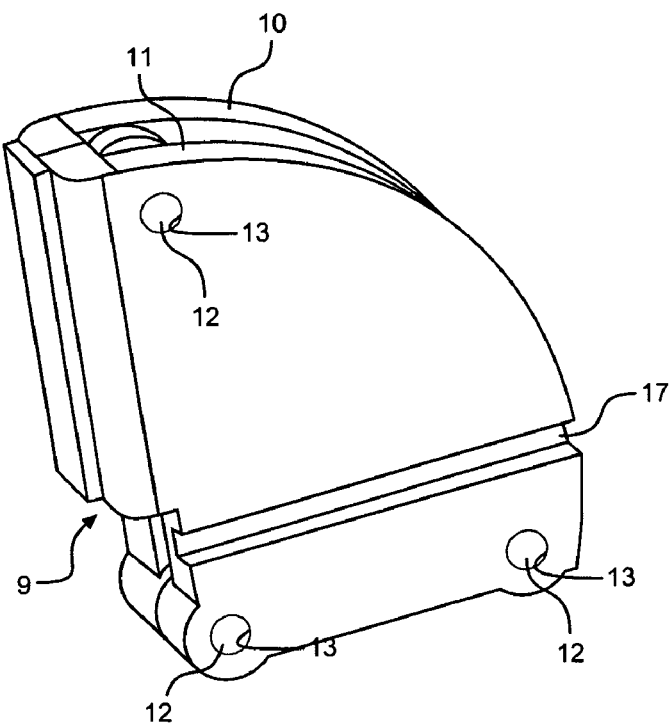
FIG. 7 is an enlarged view of one of the phototransistor baffles shown in FIG. 5.

As noted, the sensors can be configured in four basic ways. The first is a fixed multi-element configuration as shown in FIGS. 3-6 and 8. This sensor features a plurality of phototransistor sensors 8 that face radially outward and that are disposed in a circular pattern and titled upward slightly, soldered by electrical contacts to pockets 15, see FIG. 6, cut into an outside edge of a circular printed circuit board 16. This configuration places the sensors in a position to have a maximum angular view to detect the sun from below horizontal to nearly overhead, using the maximum acceptance angle of the phototransistor sensors 8. Each phototransistor sensor 8 is covered by a light baffle 9, see FIG. 7, includes two molded plastic halves 10 and 11. These halves may be held together by press fit pins 12 molded as part of one of the halves 10, which fit into holes 13 in the other half 11. The inside of each baffle 9 forms an inner chamber 14, see FIG. 5, into which a phototransistor sensor 8 fits when the baffle 9 is mounted to the circuit board. Mounting is accomplished by sliding the baffle such that grooves 17, see FIG. 7, in both outer sides of the halves 10 and 11 of the baffle 9 receive opposing flanges which define the side walls of the pockets or slots 15 cut into the outside edge of the circular printed circuit board 16. This inner chamber 14 is the innermost of a plurality of chambers 18 formed by raised curved projections 19 from each half 10 and 11 of the baffle 9. The raised curved projections 19 are placed directly across from one another on the opposite sides 10 and 11 of the baffle 9, as seen in FIG. 6.

Together the raised curved projections 19 form narrow slits of a constant width "D". This distance is set to allow an unobstructed view angle of about one degree across or in width, radially aligned with each phototransistor sensor 8, and coming from the center of each. The raised curved projections 19 serve to block any light coming from outside of that view angle, and the reflections of any light coming from outside of that view angle. This is accomplished by the placement of the raised curved projections 19 in a radial direction, and by each raised curved projection 19 having a nearly normal face 20 and an angled face 21. The angled faces 21 are on the radially outward side of the baffle 9 for all the raised curved projection 19 except the innermost. This is most effective in canceling internal reflections. The view of each phototransistor sensor 8, is a vertically oriented fan, stretching from about 75 degrees above the horizontal (plane of the printed circuit board 16) to 10 degrees below, and one degree across. Combining all the views together allows for each sensor to detect the sun crossing at all elevations below about 75 degrees. By comparing tabulated or calculated solar azimuth positions versus time for the location that the sensor is deployed to the actual times of sun sightings by the phototransistor sensors 8, the actual azimuth of the antenna 2 that the sensor 1 is mounted to can be determined.

Figure 8:
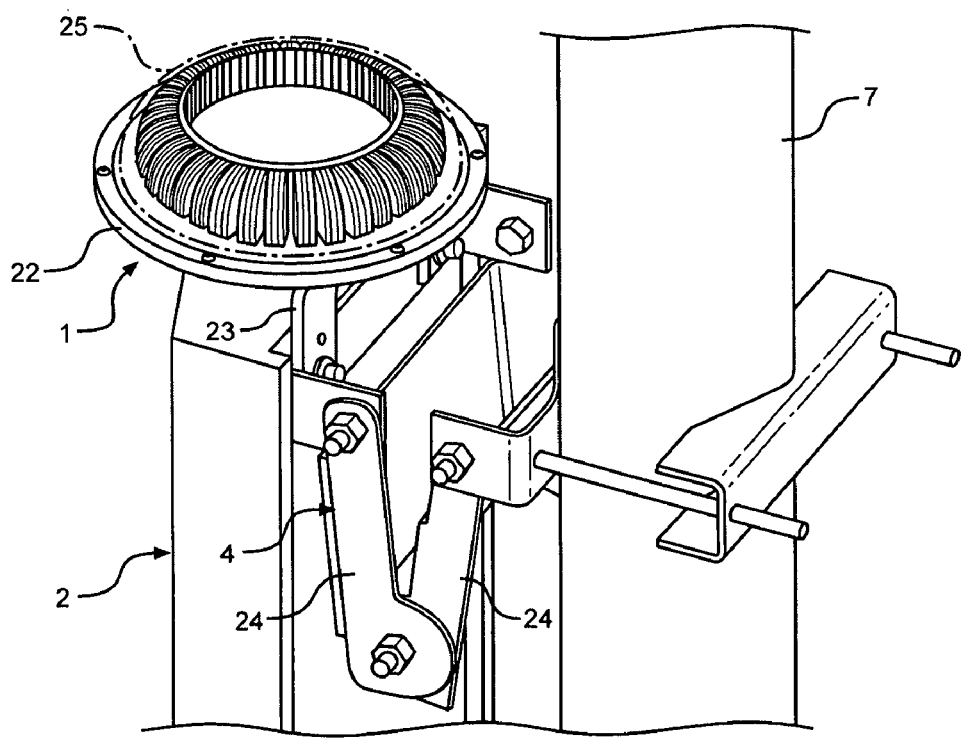
FIG. 8 is a top perspective illustrational view showing one of the sensors mounted to a mounting bracket that secures one of the antennas to a pole or towner.

The sensor 1 includes a base plate 22 that is mounted by legs 23 at a known reference on the antenna 2, such as on a back there, to the adjustable mounting bracket 4. The bracket 4 for mounting the sensor 1 to the antenna 2 is shown in FIG. 8. The number of phototransistor sensors 8 with baffles 9 is not important, other than more sensors 8 allow more opportunities for sensing the sun, and a minimum number is required especially in lower latitudes in the summer to not allow the sun to climb in elevation above the maximum view of the sensor without crossing at least one sensor view. The sensors 8, baffles 9 and printed circuit board 16 are covered by a clear plastic dome 25 which protects the internals from weather and contamination.

Figure 4:
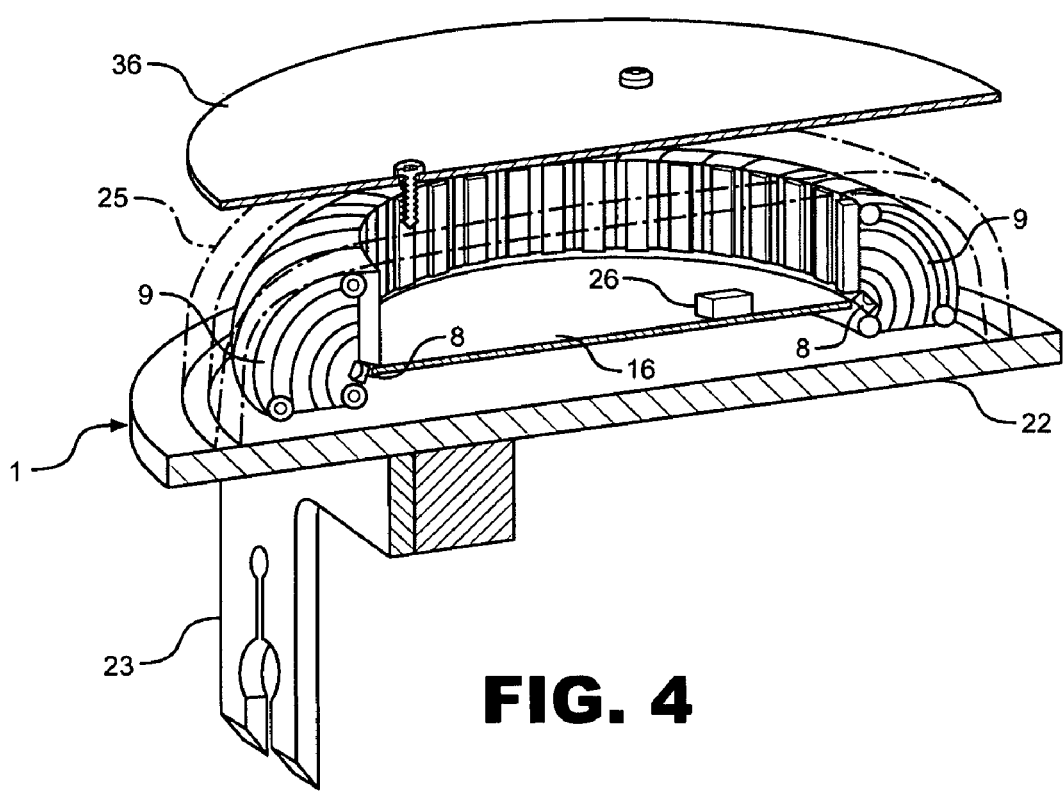
FIG. 4 is a cross sectional view through the fixed multi-element sensor of FIG. 3.
Figure 5:
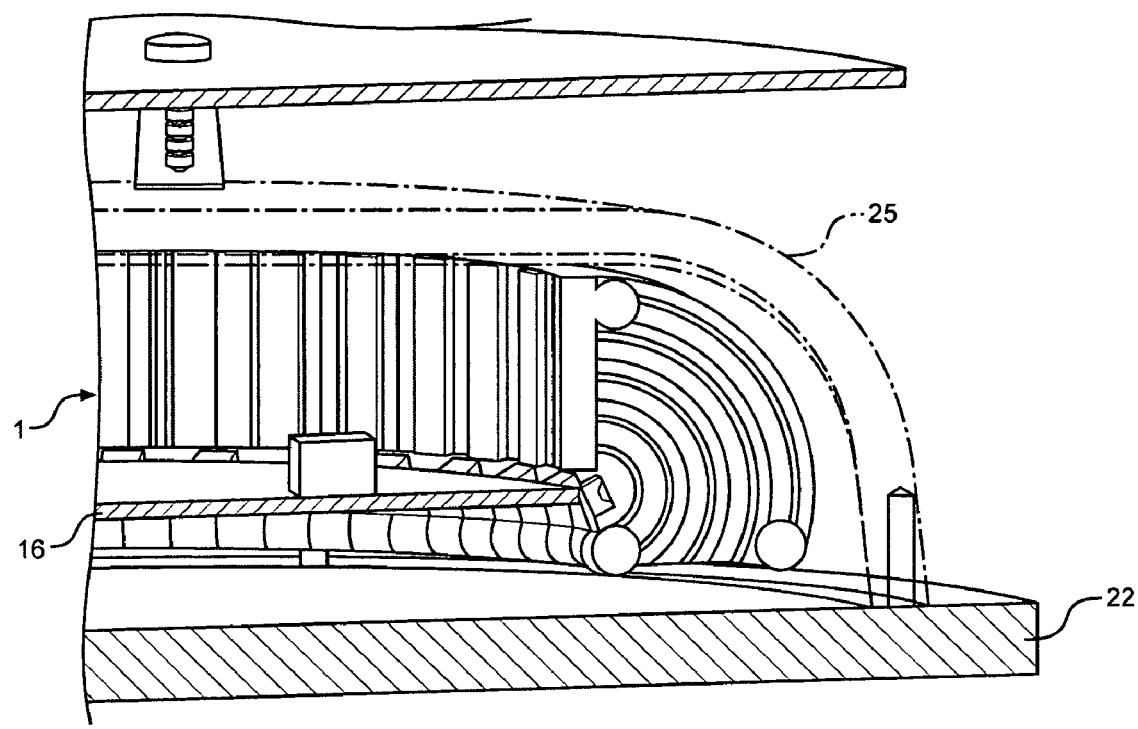
FIG. 5 is an enlarged partial cross sectional view of the fixed multi-element sensor of FIG. 3 showing phototransistors associated therewith.

One or more electronic level sensors 26, see FIG. 4, are mounted to the printed circuit board 16 for determining elevation and roll of the sensor 1, and thereby the antenna 2 it is mounted to. Level sensing is handled instantly by either a pair of electronic level sensors using a pendulum (not shown) or by a pair of solid state accelerometers 26. In either case, the instruments are placed orthogonally with one axis aligned to the antenna down tilt. The level information is available to the installer in real time, and may be used to assist with antenna alignment during installation regardless of weather conditions. Level information from all the sensors gives information in two axes: tilt (horizontal perpendicular to the antenna's preferential radiation direction) and roll (horizontal along the antenna's preferential radiation direction). Tilt is the more important parameter to an antenna's performance, but roll information is also important, because the antenna's mapped radiation pattern assumes that the antenna is mounted level in roll. Also, some antennas are mounted with a certain amount of roll for strategic reasons.

This type of sensor may also be configured with more than one circuit board 16 stacked above another (not shown) with the sensors 8 and baffles 9 clocked relative to each other to provide more accurate sensing (finer angular pitch) or reduced overall diameter of the sensor. The circuit boards may be the same size, or progressively smaller as they go up, allowing greater overhead view.

Figure 9:
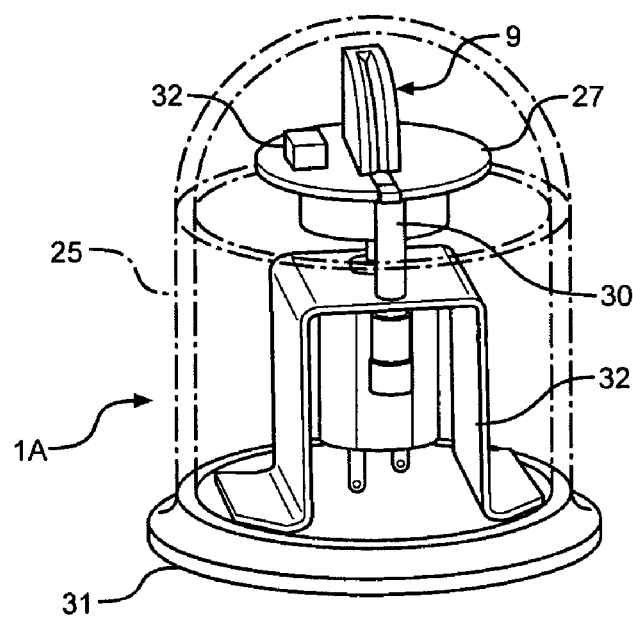
FIG. 9 is a perspective view of a modified embodiment of the present invention wherein a single phototransistor element is mounted within a housing such that the phototransistor element may be rotated to function as a single axis sweeping sensor.
Figure 10:
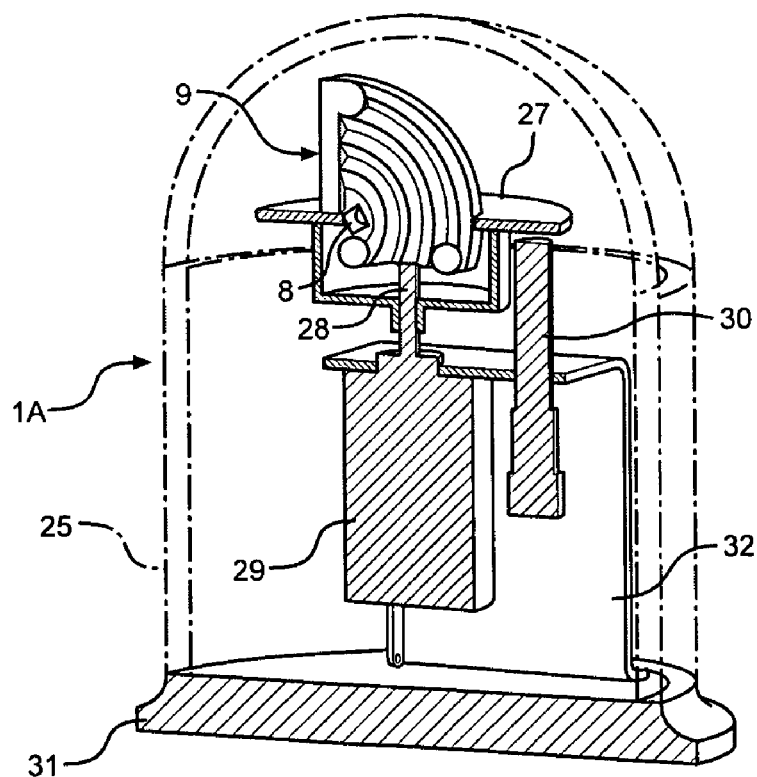
FIG. 10 is a cross sectional view of the single axis sweeping sensor of FIG. 9.

Another way to employ the combination of the above described baffle 9 with the phototransistor sensor 8 is to mount only one set of these on a smaller printed circuit board 27 mounted to a drive shaft 28 of a motor 29. This embodiment of sensor 1A is shown in FIGS. 9 and 10. The motor 29 is either a stepper motor, which moves a precise step distance on command, or a servo type with a rotary position feedback device. This is important because the exact rotational position of the motor drive shaft and thereby the baffle 9 with the phototransistor sensor 8 must be known at all times. The motor is attached to a base 31 by a motor mount 32. A start position for this measurement is given by a homing switch 30, which can be one of several types commonly used for this purpose. This homing switch 30 senses the position of the printed circuit board 27 so that a reference traceable back to the mounting of the sensor base 31 to the antenna (not shown) may be established. Electronic level sensors 32, see FIG. 9, are mounted to the printed circuit board 27 for determining elevation and roll of the sensor, and thereby the antenna (not shown) it is mounted to. These are of the same type and for the same purpose as described above.

Rotation of the baffle 9 with the phototransistor sensor 8 by use of the motor is limited to approximately plus or minus 180 degrees from a center position, because an electrical cable (not shown) is required to connect to the printed circuit board 27. This allows the sensor to scan all headings by oscillating within its limits. Rotation of the baffle 9 with the phototransistor sensor 8 by use of the motor sweeps the sensor's view around in azimuth, to find the azimuth location of the sun. By comparing tabulated solar azimuth positions versus time for the location that the sensor is deployed to the actual times and azimuth measurements of sun sightings by the phototransistor sensor 8, the actual azimuth of the antenna (not shown) that the sensor is mounted to can be determined. This sensor allows sighting the sun at any time during the day that it is below the maximum elevation of the view. This is an advantage on partly cloudy days. Also, this sensor can be made smaller overall than the sensor 1 described above. Sensor 1A may also be used to determine azimuth compared to an artificial light source (not shown), making it possible to use at any time, day or night. This is done by installing a fixed artificial light source (not shown), within the possible view of the sensor, and rotating the sensor around until the source is discovered, then saving the angular position. Comparisons of later measurements to this position will show if the antenna has moved relative to the fixed artificial light source. The sensor 1 also includes a cover 25 that is at least partially transparent so that sun, or other light, may act on the phototransistors within the sensor.

Figure 11:
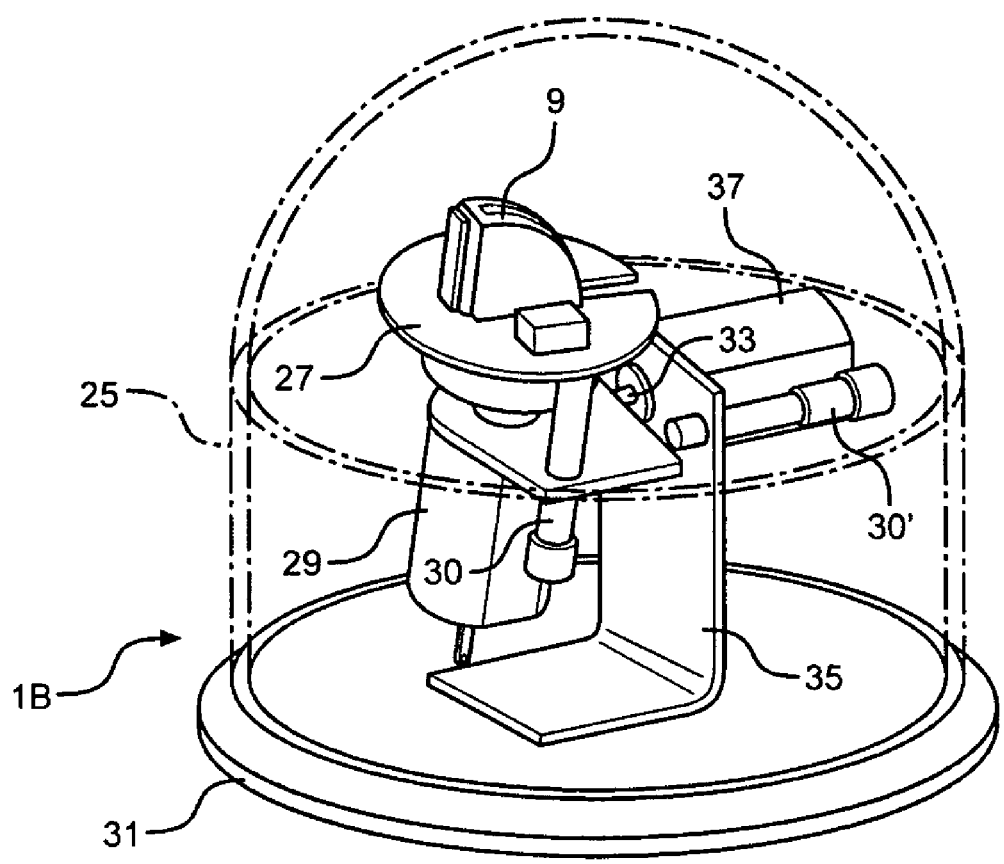
FIG. 11 is a perspective view of a further modified embodiment of the invention wherein a single phototransistor is mounted within a housing so to form a double axis sweeping sensor.

A third embodiment of sensor 1B of the invention is shown in FIG. 11 and can be made by using the basic parts described above and mounting them to the output shaft 33 of a secondary motor 34 through another mounting plate 35 which replaces the motor mount 32 of previous embodiment. This secondary motor 34 is either a stepper motor, which moves a precise step distance on command, or a servo type with a rotary position feedback device. This is important because the exact rotational position of the motor and thereby the baffle 9 with the phototransistor sensor 8 with respect to both axes of motion must be known at all times. A start position for this measurement is given by a second homing switch 30', which can be one of several types commonly used for this purpose. This homing switch 30' senses the position of the printed circuit board 27 and the mounting plate 35 so that a reference traceable back to the mounting of the sensor base 31 to the antenna (not shown) may be established. This allows the sensor to sweep the entire sky to find the sun, and by rotating the view center plane to line up with the secondary motor 34, it is possible to gain elevation information from the sun, in addition to azimuth. This would eliminate the need for the electronic level sensing device 32. The sensor 12B includes a transparent cover 25.

As antennas are often mounted in tiers, lower antennas become coated with bird droppings from birds roosting on the upper antennas. To prevent the sensors 1, 1A and 1B from being blinded by these droppings, a shield 36 may be added to the top of the sensor, see FIGS. 3 and 4. This is a disk slightly larger in diameter than the dome 25, placed some distance above the dome 25. It may be attached by screws 37 into raised bosses molded into the dome 25 for this purpose. The shield 36 limits the sensors ability to detect the sun at high elevations. Raising the height of the shield 36 will allow higher elevations of the sun to be sighted by the sensor, but offers less protection. The shield may be configured with a vertical lip or edge protruding downward (not shown) to prevent liquids from traveling under the shield by surface tension and dripping on the sensor dome. Also, the shield may be made conical, pitched up in the center (not shown) so that liquids run off faster.

The fourth embodiment of the invention is disclosed in FIGS. 12 through 15. This is a fixed, multi-element mask sensor 1C with the baffling accomplished by a stack of flat opaque plates 40 with slots 41 having angled side walls 50 molded into them that define narrow slits 52 that function the same as the slits described with respect to the sensor 1. The phototransistor sensors 42 are arranged in a circle facing up on a printed circuit board 43, see FIG. 15, so as to be below the stack of plates. The phototransistor sensors 42 have a view completely blocked by the flat opaque plates 40 above, except for where a set of the radial slots 41 line up directly above each phototransistor sensor 42. This slot configuration can be attained by the use of a set of three very thin opaque plates spaced apart vertically with very narrow aligned slits cut in them, or preferably by a set of six plates, as shown in the drawings, with alternating wider slots with at least one angled side 50 which overlap slightly, creating the effect of very narrow slits 52 defined by angled sides 50. The angled sides 50 function the same as the angled faces 21 of the projections 19 of the sensors 1 described herein. The angled sides are necessary to reduce low angle reflections of the sun off of the edges of the slots into the sensor. In order to create chambers in the stack of plates similar to those shown at 18 of sensor 1, every other plate is stacked upside down relative to the adjacent plates in the stack. That is, the beveled or angled sides define an internal volume between two vertically spaced slits. For the same reasons as previously described, the angled walls should face upwardly except for the lowest plate.

There can be as few as two sets of slotted plates, and more than six would also work. These spaced narrow radial slots 41 with angled edges are effective in blocking off-axis views of the sun created by internal reflections, ensuring only true direct sightings are viewed by the phototransistor sensors 42. The phototransistor sensors 42 as mounted in this sensor have a narrow fan shaped view overhead. The view is about one degree across, and angles downward from vertical about 60 degrees, or down to about 30 degrees above the horizon. This is not low enough to see the sun in the winter at many latitudes, so a mirror 44 is necessary. This mirror 44 is conical, with the large end up. The outer surface is polished to reflect light. It is mounted above the phototransistor sensors 42 and the stack of flat opaque plates 40. The mirror 44 is dimensioned so that the small end is just inside a vertical line projected up from each of the phototransistor sensors 42, and angled so that a view from about 10 degrees above horizontal up to slightly overlapping the direct view of the phototransistor sensors 42 of about 30 degrees above horizontal. The mirror can be a surface of revolution, but that introduces power loss due to the curvature of the reflecting surface.

Figure 12:
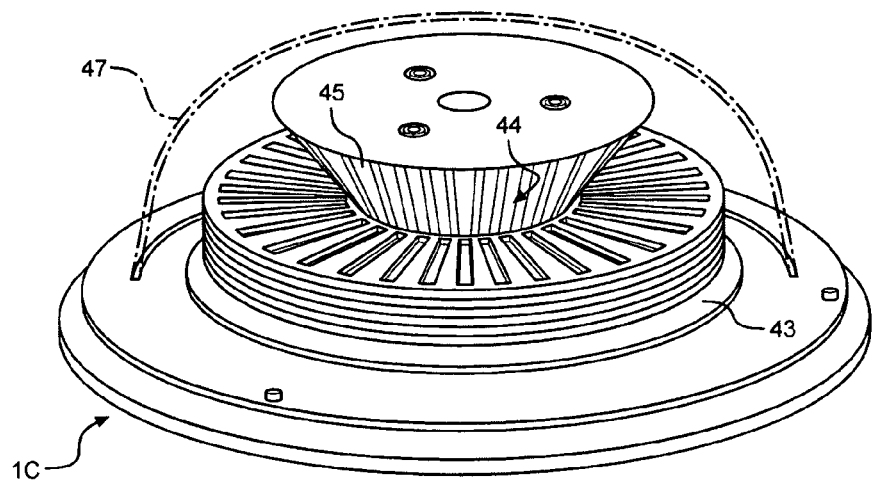
FIG. 12 is a perspective view of yet another embodiment of the invention formed as a flat mask fixed sensor.
Figure 13:
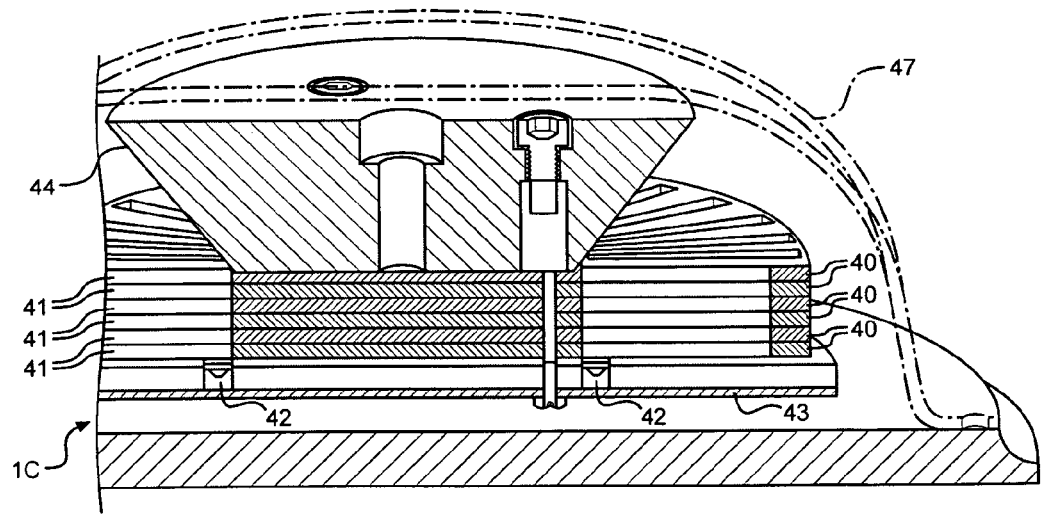
FIG. 13 is a cross sectional view of the flat mask fixed sensor of FIG. 12.
Figure 14:
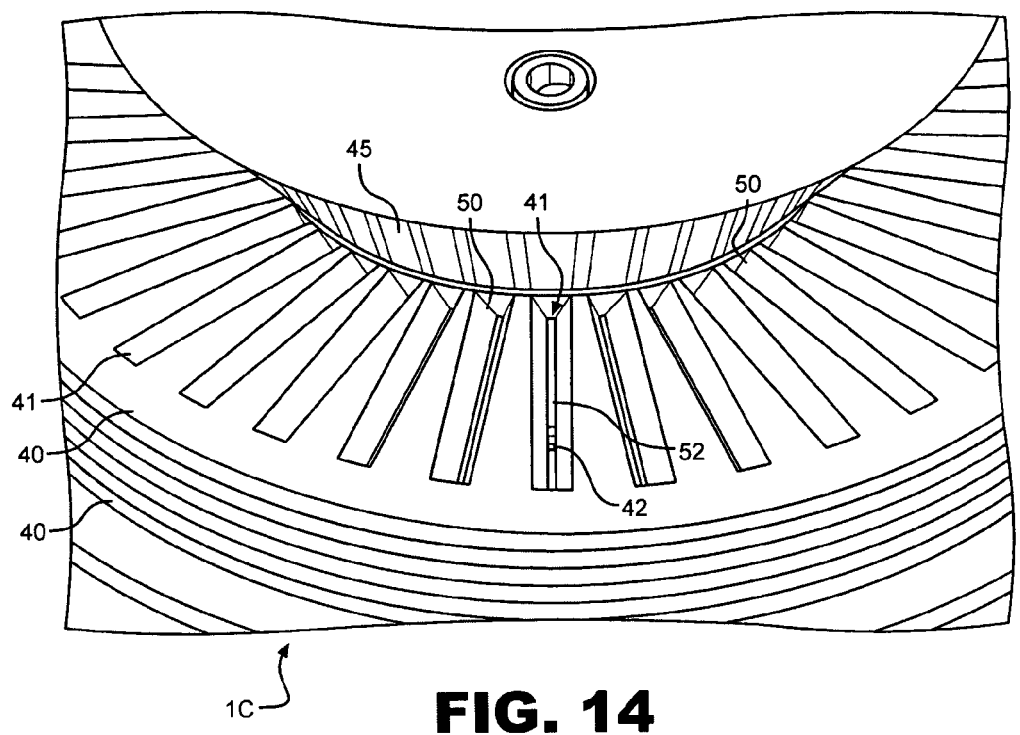
FIG. 14 is an angled overhead view of the flat mask fixed sensor showing a phototransistor through the slots in plates forming the mask.
Figure 15:
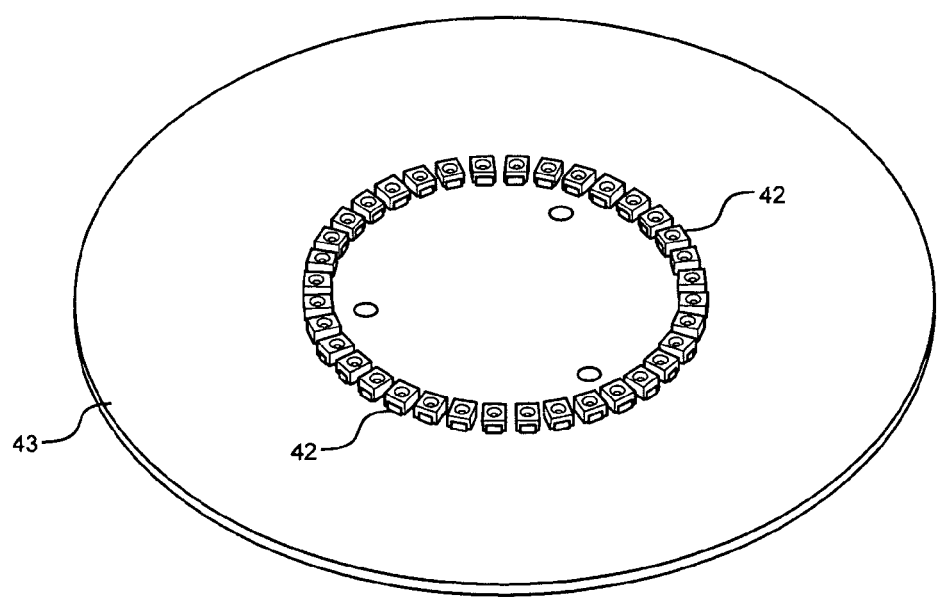
FIG. 15 is an angled overhead view of a circuit board with phototransistors used with the flat mask fixed sensors, with the plates and mirror(s) or reflector(s) removed.

A better solution is the flat faceted design shown in FIGS. 12 and 14, where each facet 45 lines up with a phototransistor sensor 42 and a set of narrow radial slots 41 through the flat opaque plates 40. To prevent stray light from entering the phototransistor sensors 42 from under the edge of the flat opaque plates 40, an o-ring is placed outside the ring of phototransistor sensors 42, between the bottom flat opaque plate 40 and the printed circuit board 43.

Electronic level sensors (not shown, but similar to the ones pictured in the other configurations above) are mounted to the printed circuit board 43 for determining elevation and roll of the sensor, and thereby the antenna 2 it is mounted to. Level sensing is handled instantly by either a pair of electronic level sensors using a pendulum (not shown) or by a pair of solid state accelerometers. In either case, the instruments are placed orthogonally with one axis aligned to the antenna down tilt. Azimuth sensing is identical in function to the other fixed multi-element sensor. A clear plastic dome 47 is used to protect the internal parts as in the sensors above.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. A directional alignment and alignment monitoring apparatus for directional and omni-directional antennas comprising; a light sensor assembly having a housing adapted to be mounted in a known angular relationship on an antenna, at least a portion of the housing being transparent so that light from a source exterior to the housing may enter into the housing, at least one phototransistor mounted within the housing and spaced from the transparent portion of the housing, at least one light controlling baffle member mounted within the housing so as to control illumination of the at least one phototransistor by light entering the housing, the at least one baffle member including a light admitting passageway having a outer light entrance opening that is oriented toward the transparent portion of the housing and is spaced from the at least one phototransistor and an inner opening that is adjacent the at least one phototransistor, the passageway being aligned with the at least one phototransistor such that light entering the outer light entrance is channeled to the at least one phototransistor through the passageway only when the light source is generally aligned with the passageway, the passageway extending at least partially at a vertical angle relative to a horizontal plane, and circuit means for connecting the at least one phototransistor to a monitoring system whereby a time of illumination of the at least one phototransistor by the light passing through the passageway is used to determine an angular position of the sensor relative to a known position of the light source.

2. The directional alignment and alignment monitoring apparatus of claim 1 wherein the at least one baffle member includes opposing inner side walls that define the passageway there between, an outer wall oriented outwardly of the housing in which the entrance opening is located, and an inner portion oriented toward the at least one phototransistor.

3. The directional alignment and alignment monitoring apparatus of claim 2 wherein the passageway extends in a vertical arc a predetermined number of degrees along a first axis about which an angular measurement is to be taken.

4. The directional alignment and alignment monitoring apparatus of claim 3 wherein the vertical angle of the passageway extends upwardly to approximately 75 degrees relative to the horizontal plane.

5. The directional alignment and alignment monitoring apparatus of claim 4 wherein the passageway extends to approximately 10 degrees below the horizontal plane.

6. The directional alignment and alignment monitoring apparatus of claim 3 wherein the outer wall of the at least one baffle member is convexly arcuate from a bottom thereof to a top thereof.

7. The directional alignment and alignment monitoring apparatus of claim 3 including at least one radially spaced curved projection extending inwardly from each of the opposite inner side walls such that the curved projections of the opposing side walls are aligned with one another and spaced to form a narrow arcuate slit along the passageway of predetermined width for further controlling light passage through the passageway toward the at least one phototransistor.

8. The directional alignment and alignment monitoring apparatus of claim 7 including a plurality of radially spaced opposing curved projections defining a plurality of radially spaced slits along the passageway, and wherein a plurality of chambers are defined between the spaced opposing and curved projections.

9. The directional alignment and alignment monitoring apparatus of claim 8 wherein at least an outermost of the aligned curved projections include outwardly oriented angled faces for reflecting incoming light away from the slits formed there between on one side thereof and generally planar faces on the opposite side thereof that are oriented generally perpendicularly relative to the passageway.

10. The directional alignment and alignment monitoring apparatus of claim 9 wherein at least an innermost pair of the opposing curved projections each include a rear angled face for reflecting light toward the at least one phototransistor and an opposite planar face that extends generally perpendicular with respect to the passageway.

11. The directional alignment and alignment monitoring apparatus of claim 10 wherein the at least one phototransistor is seated within the inner opening of the passageway so that only light passing through the passageway may reach the at least one phototransistor.

12. The directional alignment and alignment monitoring apparatus of claim 11 including means for pivotally moving the at least one baffle member about the first axis to thereby change a directional orientation thereof and means for determining the directional orientation of the at least one baffle member.

13. The directional alignment and alignment monitoring apparatus of claim 12 further including means for pivotally moving the at least one baffle member about a second axis that is generally perpendicular to the first axis and means for determining an orientation of the at least one baffle member relative to the generally second axis.

14. The directional alignment and alignment monitoring apparatus of claim 11 wherein the sensor includes a plurality of baffle members arranged in a generally circular relationship within the housing and each being associated with one of a plurality of phototransistors supported on a base of the housing and the transparent portion of the housing extending over the plurality of baffle members.

15. The directional alignment and alignment monitoring apparatus of claim 1 including a plurality of baffle members with each being associated with one of a plurality of phototransistors supported on a base of the housing and the transparent portion of the housing extending over the plurality of baffle members.

16. The directional alignment and alignment monitoring apparatus of claim 15 including a shield mounted above the housing to thereby prevent falling waste from adversely effecting passage of light into the housing.

17. The directional alignment and alignment monitoring apparatus of claim 4 including a plurality of baffle members arranged in a generally circular relationship within the housing and each being associated with one of a plurality of phototransistors supported on a base of the housing and the transparent portion of the housing extending over the plurality of baffle members.

18. The directional alignment and alignment monitoring apparatus of claim 1 including at least one level sensor mounted to the light sensor assembly.

19. A directional alignment and alignment monitoring apparatus for directional and omni-directional antennas comprising; a light sensor assembly having a housing adapted to be mounted in a known angular relationship on an antenna, at least a portion of the housing being transparent so that light from a source exterior to the housing may enter into the housing, at least one phototransistor mounted within the housing, at least one light controlling baffle member mounted within the housing so as to control light entering the housing toward the at least one phototransistor, the at least one baffle member including a light admitting passageway that is aligned with the at least one phototransistor such that light entering the housing is channeled to the at least one phototransistor through the passageway only when the light source is generally aligned with the passageway, said at least one baffle member including a stack of at least two opaque plates mounted above the at least one phototransistor, each plate having at least one slot formed therethrough which is aligned with the slot in the other plate and which define the light admitting passageway, reflective means within the housing oriented to reflect light entering into the housing toward the at least one slot of one of the at least two opaque plates, and circuit means for connecting the at least one phototransistor to a monitoring system whereby a time of illumination of the at least one phototransistor may be used to determine an angular position of the sensor relative to a known position of the light source.

20. The directional alignment and alignment monitoring apparatus of claim 19 including a plurality of radially extending slots in each opaque plate which align with a plurality of phototransistors, and each slot being defined by at least one angled wall that converges to an open slit through which light passes toward one of the plurality of phototransistors.

21. The directional alignment and alignment monitoring apparatus of claim 20 wherein the reflective means includes a plurality of facets wherein each facet is aligned to reflect light toward a predetermined slot.

22. The directional alignment and alignment monitoring apparatus of claim 20 wherein the plurality of phototransistors are supported in a generally circular relationship within the housing, the at least one baffle member including more than two vertically stacked opaque plates, the opaque plates being mounted within the housing such that the slits in the plurality of plates align with one another and with the plurality of phototranducers, and the reflective means reflecting light entering the housing toward separate slits in one of the opaque plates depending upon a relative position of the light source with respect to the apparatus.

23. The directional alignment and alignment monitoring apparatus of claim 20 wherein the housing includes a transparent cover that extends over the at least two plates.

24. A directional alignment and alignment monitoring apparatus for directional and omni-directional antennas comprising; a light sensor assembly adapted to be mounted in a known angular relationship on an antenna, the light sensor assembly including a housing at least a portion of which is transparent so that light from a source exterior to the assembly will enter into the housing, at least one phototransistor mounted within the housing and spaced from the transparent portion of the housing, at least one light controlling baffle member mounted within the housing so as to control illumination of the at least one phototransistor by light entering the housing, the at least one baffle member including opposing halves that when joined to one another define a light admitting passageway there between, the passageway having an elongated outer light entrance opening that is oriented toward the transparent portion of the housing and spaced from the at least one phototransistor and an inner chamber that is oriented toward and adjacent to the at least one phototransistor, the passageway converging from the elongated outer light entrance opening toward the inner chamber and being aligned with the at least one phototransistor such that light entering the elongated outer light entrance is channeled to the at least one phototransistor through the passageway only when the light source is generally aligned with the passageway, the passageway extending at least partially at a vertical angle relative to a horizontal plane, each half of the at least one baffle member including at least one projection that oppose one another when the halves are joined together and being spaced a distance to define a light passage slit that is oriented within the passageway, and circuit means for connecting the at least one phototransistor to a monitoring system whereby a time of illumination of the at least one phototransistor by the light passing through the passageway is used to determine an angular position of the sensor relative to a known position of the light source.

* * * * *